(12) United States Patent
Nagarkar et al.

(10) Patent No.: US 8,779,097 B2
(45) Date of Patent: Jul. 15, 2014

(54) ACCELERATED GELATION OF REGENERATED FIBROIN

(75) Inventors: Shailesh Prakash Nagarkar, Pune Maharashtra (IN); Ashish Kishore Lele, Pune Maharashtra (IN)

(73) Assignee: Council of Scientific & Industrial Research, New Delhi (IN)

( * ) Notice: Subject to any disclaimer, the term of this patent is extended or adjusted under 35 U.S.C. 154(b) by 20 days.

(21) Appl. No.: 13/387,870

(22) PCT Filed: Jul. 30, 2010

(86) PCT No.: PCT/IN2010/000506
§ 371 (c)(1),
(2), (4) Date: Jan. 30, 2012

(87) PCT Pub. No.: WO2011/013145
PCT Pub. Date: Feb. 3, 2011

(65) Prior Publication Data
US 2012/0130047 A1    May 24, 2012

(30) Foreign Application Priority Data

Jul. 31, 2009  (IN) .......................... 1578/DEL/2009

(51) Int. Cl.
*C07K 14/435* (2006.01)
*A61K 38/17* (2006.01)

(52) U.S. Cl.
USPC .......................................... 530/354; 530/355

(58) Field of Classification Search
USPC .................................................. 530/354, 355
See application file for complete search history.

(56) References Cited

U.S. PATENT DOCUMENTS 4,233,212 A * 11/1980 Otoi et al. ..................... 530/353

FOREIGN PATENT DOCUMENTS

WO    WO 2008/150861 A1 * 12/2008

OTHER PUBLICATIONS

Kim et al., Biomacromolecules 5, 786-792 (2004).*
Feng et al., International J. Biol. Macromolecules 40, 105-111 (2007).*
Cheng et al., Acta Polymerica Sinica, No. 10, 974-978 (2008).*

* cited by examiner

*Primary Examiner* — Chih-Min Kam
(74) *Attorney, Agent, or Firm* — Abelman, Frayne & Schwab

(57) ABSTRACT

The invention discloses a process for the acceleration of gelling time of regenerated silk fibroin using gelling agent, preferably silica to create a porous structure, devoid of microbial growth.

8 Claims, 4 Drawing Sheets

ACCELERATED GELATION OF REGENERATED FIBROIN

This application claims priority to and the benefit of International PCT Application Serial No. PCT/IN2010/000506, filed Jul. 30, 2010, and also claims priority to Indian Patent Application No. 1578/DEL/2009, filed Jul. 31, 2009, both applications are incorporated by reference herein in their entirety.

FIELD OF THE INVENTION

Present invention relates to a process for the acceleration of gelation of regenerated fibroin. Present invention further relates to a process of using an agent such as silica to create a porous structure of regenerated fibroin.

BACKGROUND OF THE INVENTION

Regenerated silk fibroin (RSF) gels are known to have porous microstructures that can be tuned to obtain controllable mechanical properties. The high strength of the fibroin gel, its porosity and its biocompatibility make it a potentially interesting biomaterial for applications such as 3D porous scaffolds for tissue engineering.

The gelation time of RSF depends on pH and concentration of fibroin in solution. The potential importance of fibroin gels is in biomedical research where the desirable pH is 7.2-7.4 for cell growth. It is observed that RSF of concentrations in the range 1 to 10 g/L can take as much as 30 to 60 days at pH 7 for gelation whereas, RSF of higher protein concentration in the range of 10 to 100 g/L takes 10 to 20 days at pH 7 to turn into a gel (Refer FIG. 1). RSF gels prepared from solutions of higher protein concentration do not have adequate porosity for cell ingress and growth. Therefore, it is desirable to create microporous gels from RSF of lower protein concentration at pH 7. Prolonged exposure to higher temperature ranges result in precipitation of proteins and loss of microporous structure, which is not desirable for application envisaged for RSF> Considerably long time is required for gelation of such solutions during which fungal growth is observed in silk solution/gel if, aseptic environment is not maintained. Considering its potential application in tissue engineering, use of antifungal agent needs to be avoidable so that cell line is not subjected to toxic environment. There is therefore a need to decrease the gelation time of RSF at pH 7 and room temperature. A. Lele et al in a poster for the International Congress on Rheology, 3-8 Aug. 2008 and in *Phys. Chem. Chem. Phys.*, 2010, 12, 3834-3844 have studied the mechanism of gelation of regenerated fibroin solution. They also studied the structure and characteristics of the silk hydrogels formed.

References may be made to article titled, "Silk Polymer Designs for Improved Expression and Processing" by Dr. David L. Kaplan, discloses control of silk gelation wherein gelation of silk fibroin depends upon silk fibroin concentration, temperature and pH on gel formation and protein structure which can be related to primary sequence-specific features in the molecular organization of the fibroin protein. Further, the said article also describes Silk-Inorganic Nanocomposites—Silica Systems wherein cloning, expression and function of silk-R5 fusions for formation of silica nanocomposites were studied.

References may be made to article titled, "Novel nanocomposites from spider silk-silica fusion (chimeric) proteins" by Wong et al., 2006, discloses novel biomimetic nanocomposites approach to synthesize silica composites using fusion (chimeric) proteins. Fusion proteins have found applications in a wide spectrum of areas such as the biomedical field [including immunology, cancer research, and drug delivery (17-20)] and materials science [self-assembled materials (e.g., gels), quantum dot bioconjugates, sensors, and inorganic materials synthesis (21-27)].

References may be made to article titled, "Composite Material Made of Regenerated Silk Fibroin and Silica Sol" by Cheng Cheng et al. published on 2008/10 discloses that regenerated silk fibroin solution and silica sol were mixed to produce the silk fibroin/silica composite materials. In order to probe if there is interaction between silk protein and silica, and further more, whether the interaction can improve the mechanical properties of composite materials, the structure and properties of the silk fibroin/silica composite material were studied by dynamic mechanical analysis (DMA) together with scanning electron microscopy (SEM) and Raman spectroscopy. The SEM results revealed the good compatibility between silk fibroin and silica in the composite. Nano-sized silica particles dispersed evenly in the continuous matrices of silk fibroin. Raman spectra of the composite materials indicated that the silk fibroin was dominated by beta sheet conformation. Comparing to the pure silk fibroin material, the composites showed better dynamic mechanical properties.

References may be made to patent application WO 200512606, wherein application claims aqueous silk fibroin solutions and process for making the same, method of producing a fiber, silk foam, film and silk hydrogels. On page 30 of said PCT application, the study of influence of ions, pH, temperature and PEO on gelation of silk fibroin solution is discussed.

The prior art survey reveals that there is no document that teaches the process of acceleration of gelation, thereby decreasing gelation time. Particularly no prior art document teaches the process of acceleration of gelation time of silk fibroin employing an accelerating agent.

OBJECTIVE OF THE INVENTION

Main objective of the present invention is to decrease the gelation time of RSF gels to fulfill the gap in the art.

Another objective of the present invention is to decrease the RSF gelling time using a process that does not cause microbial growth in the gel medium.

Yet another objective of the present invention is to decrease the gelling time by a process such that it is not toxic to cell lines.

SUMMARY OF THE INVENTION

Accordingly, present invention provides a process to accelerate the gelation of regenerated silk fibroin (RSF) having porous structure comprising the steps of:
  a) adjusting the pH of the regenerated silk fibroin solution to pH 5-7.5 and adjusting its concentration in the range of 0.1 to 40%;
  b) adding the gelation agent of desired concentration and maintaining temperature conditions and
  c) checking for gelation by tube inversion method to obtain RSF gel.

In an embodiment of the present invention, said gelation agent is selected from the group consisting of silica, $TiO_2$, $FeO_2SiN_3$, hydroxyapetite, and other biocompatible inorganic compounds, preferably silica.

In an another embodiment of the present invention, said gelation is optionally carried out by self seeding with β-sheet of a protein, in alkaline conditions, preferably fibroin protein.

In yet another embodiment of the present invention, said process is carried out at temperature in the range of 20-70° C.

In yet another embodiment of the present invention, said gelation agent is used in the concentration range of 1 g/l to 25 g/l, preferably 1 to 5 g/l.

In yet another embodiment of the present invention, particle size of said gelation agent is in the range from 1 nm-1μ, preferably 1 nm to 400 nm.

In yet another embodiment of the present invention, the regenerated silk fibroin gel having porous structure, pore size of said gel ranges from 1-10 micron.

In yet another embodiment of the present invention, the regenerated silk fibroin gel having porous structure, said gel comprises nanoporous walls of porosity ranging between 1 to 500 nm.

In yet another embodiment of the present invention, the regenerated silk fibroin gel having porous structure, said gel is free of microbial growth.

DETAILED DESCRIPTION OF THE INVENTION

Present invention discloses a process that decreases the gelation time of RSF. The composition of RSF and the gelling agent, gels in 2-24 hours at pH 7-8, resulting in a micro porous gel with nanoporous walls. The composition is a powder, film, a shaped object, a molded object and such like for seeding cells and delivering active agents.

The phrase "Regenerated Silk Fibroin" and "Regenerated Protein Fibroin" are used interchangeably through out the specification are and a skilled person may appreciate as such.

The phrase "Silk" and "Protein" are used interchangeably through out the specification are and a skilled person may appreciate as such.

Figure 1:
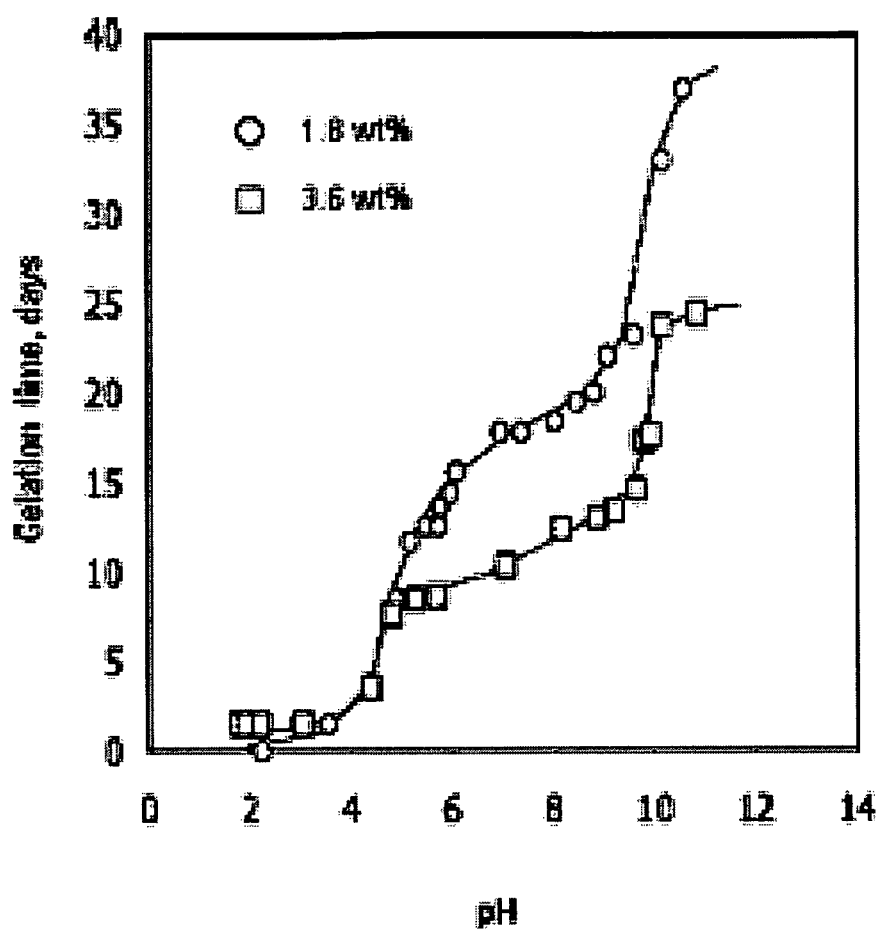
FIG. 1: Gelation time of RSF at various pH (D. Kaplan, JPC B, 110, 2006, 21630-21638)
Figure 2:
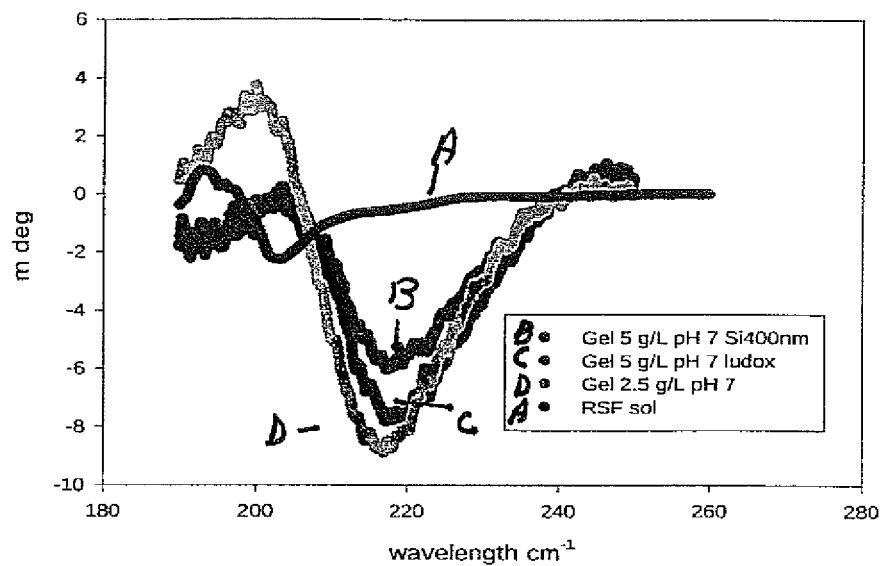
FIG. 2: Circular dichorism study on RSF sol and RSF gel containing various silica nanoparticles of the invention at pH 7 and 25° C.
Figure 3:
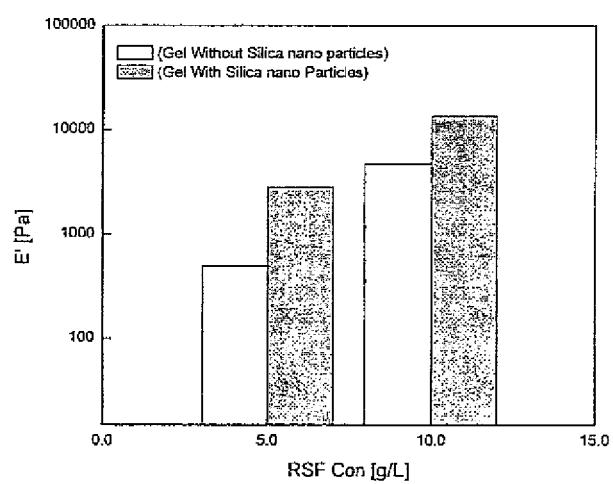
FIG. 3: Compression modulus measurements on RSF gels of the invention with and without nanoparticles.
Figure 4:
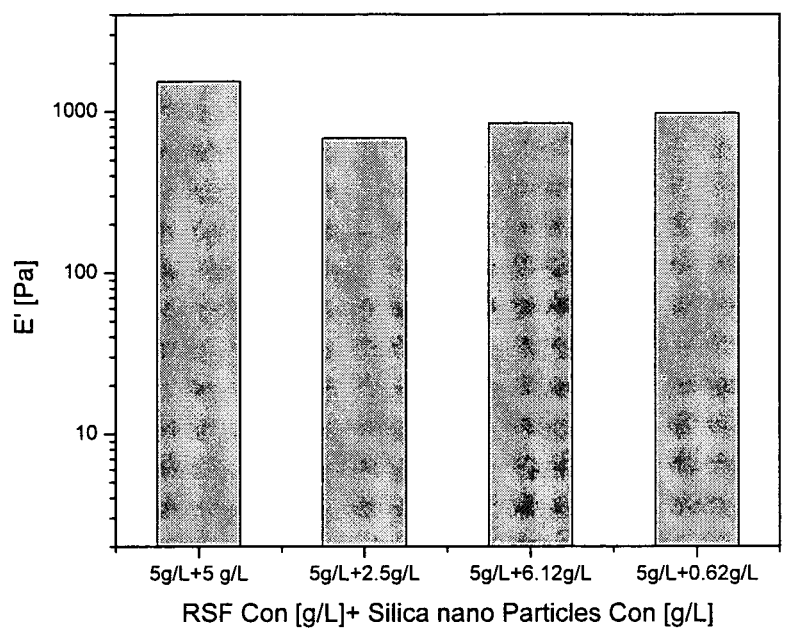
FIG. 4: Compression modulus and gelation time study of 5 g/L RSF gel in presence of various concentrations of nanoparticles.

In accordance with the objectives of the invention, various processes were tried to decrease the gelation time of RSF gels. The RSF gels are formed at room temperature at pH 7.0 in about two weeks to three months depending on protein (silk) concentration (Refer FIG. 1). To decrease the gelation time, one alternative is to reduce the pH, but acidic pH does not allow propagation of cells. In one of the experiments, it was surprisingly found that addition of silica nanoparticles decreased the gelation time from months to few days or few hours, the gelation time varying with variations in temperature of process, concentration of protein and particle size of silica nanoparticles. The resulting composition comprised the regenerated silk fibroin gel, water and the agent that decreases the gelation time, creating a porous structure of regenerated fibroin.

Accordingly, the present invention discloses process to accelerate the gelation of regenerated silk fibroin having porous structure comprising the steps of:
a. adjusting pH of the regenerated silk fibroin solution to pH 7 and adjusting its concentration;
b. adding gelation agent and maintaining temperature conditions; and
c. checking for gelation by tube inversion method.

Figure 6:
FIG. 6: The tube inverted showing the formation of the gel. The first tube shows the sol of RSF. The second tube shows the gel formed, tested by tube inversion method confirming the formation of gel.

The gel formation is checked by tube inversion method, as observed in FIG. 6.

The gelation agent not only decreases the time for gelation but also overcomes the issue of microbial growth. In the absence of the gelling agent, gelation took more than three weeks at pH 7-8 for temperature in the range of 5-70° C., and during this period microbial growth was observed. However, in the presence of silica nanoparticles no microbial growth was observed before gelation.

Further, such agents are biocompatible and are non toxic to cell lines that will be grown on these micro porous networks of RSF gels.

The gelation agent used in the present invention is selected from nanoparticles of silica, $TiO_2$, $FeO_2$ $SiN_3$, hydroxyapatite, and other biocompatible inorganic compounds.

Gelation time is decreased with the increase in gelation agent concentration, varying from 1 g/L to 25 g/L or above. The particle size of the agent varies from 1 nm-400 nm and the gelation time decreased by at least half the time taken without the agent. In some cases the gelation time decreases by at least an order of magnitude. Further, process of accelerating the gelation is carried at temperature ranging from 20° C. to 70° C.

The results of the various trials with different temperature range and concentration of gelation agent are tabulated herein below in Table 1, 2 and 3.

TABLE 1

Gelation time chart showing effect of silica particles on gelation time of RSF samples

| S. N. | Temperature [° C.] | Protein Conc (Silk-concentration) [g/L] | Gelation time without using silica on different temperature | Gelation time for different sizes of silica nano particles (5 g/L) at pH 7.2 | | |
|---|---|---|---|---|---|---|
| | | | | 40 nm | 150 nm | 400 nm |
| 1 | 25 | 1 | >30 days | 6 days | 5 days | 5 days |
| 2 | 50 | 1 | >30 days | 12 hrs | 10 hrs | 10 hrs |
| 3 | 70 | 1 | >30 days | 12 hrs | 10 hrs | 10 hrs |

TABLE 2

Gelation time chart showing effect of silica
particles on gelation time of RSF samples

| S. N. | Temperature [° C.] | Protein Conc [g/L] | Gelation time without using silica | Gelation time for different sizes of silica nano particles (1 g/L) at pH 7.2 | | |
|---|---|---|---|---|---|---|
| | | | | 40 nm | 150 nm | 400 nm |
| 1 | 25 | 5 | >30 days | 2 days | 2 days | 2 days |
| 2 | 50 | 5 | Ppt formed | 4 hrs | 3 hrs | 3 hrs |
| 3 | 70 | 5 | Ppt formed | 4 hrs | 3 hrs | 3 hrs |

Precipitate is formed in 15 days and remains so for greater than 30 days.

TABLE 3

Gelation time chart showing effect of increasing silica
particle concentration on gelation time of RSF samples

| S. N. | Temperature [° C.] | Protein Conc [g/L] | Gelation time without using silica | Gelation time for different concentrations of silica nanoparticles at pH 7.2 | | | | |
|---|---|---|---|---|---|---|---|---|
| | | | | 5 g/L | 2.5 g/L | 1.25 g/L | 0.624 g/L | 0.362 g/L |
| 1 | 25 | 5 | >30 days | 14 hrs | 20 hrs | 20 hrs | 24 hrs | 30 hrs |

From the above results it is noted that when protein concentration was 1 g/L, the gelation time is as low as 5 days for the silica particle of 400 nm at 25° C. and is reduced to 10 hours when the process is carried out at 70° C. and pH 5-7. At higher protein concentration of 5 g/L the gelation time is 3 hours for 400 nm particle size of silica and temperature is 70° C. and pH 7.2. Thus the acceleration of the gelation process of RSF is achieved by increasing the concentration of gelation agent but maintaining the temperature and maintaining the pH using dilute hydrochloric acid.

In present invention, the protein concentration varies from 0.1-40%. The composition forms a network of micro porous gel with pore size ranging from 1-10 micron having nanoporous walls with the porosity of the wall ranging from 1-500 nm.

In one more aspect of the invention, self seeding with β sheet of a protein resulted in the acceleration of gelation time.

In a preferred aspect, the gelation time of RSF is accelerated by self seeding the solution of RSF with the gel in alkaline conditions. Silica is not present in this RSF.

TABLE 4

Gelation time chart showing effect of self seeding
the solution of RSF with the gel in alkaline conditions
on gelation time of RSF samples

| Sample no | Seeding time (Hrs) | State of sample vial at seeding time | Gelation time after addition of 3M NaOH (Hrs) | Gelation time for sol at pH 2 (Hrs) |
|---|---|---|---|---|
| 1 | 0 | Solution | Not yet gel (after 7 days) | 27 |
| 2 | 3 | Solution | 40~50 | 24 |
| 3 | 6 | Solution | 40~50 | 24 |
| 4 | 9 | Solution | 16~18 | 24 |
| 5 | 12 | Solution | 18 | 24 |
| 6 | 15 | solution | 18 | 24 |
| 7 | 18 | Translucent solution | 20 | 24 |
| 8 | 21 | turbid solution | 21 | 24 |
| 9 | 24 | Gel | Gel | 24 |

Composition is cast as a film, is a powder or is a shaped or molded object. The composition comprises additives to aid in casting the film or molding as an object.

The gels are characterized for their mechanical properties and 3D porosity as exemplified herein.

Such compositions find use for seeding cells, as drug delivery agents and such like.

EXAMPLES

The following examples are given by way of illustration only and therefore should not be construed to limit the scope of the present invention.

Example 1

Preparation of Composition of RSF

The RSF solution was prepared using procedure described in Nagarkar et al (*Ind. Eng. Chem. Res.* 2009, 0-11). The pH of dialysed RSF solution was adjusted to 7 by adding 0.1N HCL with constant stirring. The concentration of protein was adjusted to 1 g/L using de-ionised water of pH 7. Known weight of silica nanoparticles of 40 nm was added to the RSF solution. These solutions were kept at 25° C., 50° C. and 70° C. in a constant temperature water bath and the state of the sample was monitored after every 3 hrs. The gel state and gelation time were noted using vial tilting method.

Example 2

Preparation of Composition of RSF

The RSF solution was prepared using procedure described in Nagarkar et al (*Ind. Eng. Chem. Res.* 2009, 0-11). The pH of dialysed RSF solution was adjusted to 7 by adding 0.1N HCL with constant stirring. The concentration of protein was adjusted to 1 g/L using de-ionised water of pH 7. Known weight of silica nanoparticles of 150 nm was added to the RSF solution. These solutions were kept at 25° C., 50° C. and 70° C. in a constant temperature water bath and the state of the sample was monitored after every 3 hrs. The gel state and gelation time were noted using vial tilting method.

Example 3

Preparation of Composition of RSF

The RSF solution was prepared using procedure described in Nagarkar et al (*Ind. Eng. Chem. Res.* 2009, 0-11). The pH of dialysed RSF solution was adjusted to 7 by adding 0.1N HCL with constant stirring. The concentration of protein was adjusted to 1 g/L using de-ionised water of pH 7. Known weight of silica nanoparticles of 400 nm was added to the RSF solution. These solutions were kept at 25° C., 50° C. and 70°

C. in a constant temperature water bath and the state of the sample was monitored after every 3 hrs. The gel state and gelation time was noted using vial tilting method.

Example 4

Preparation of Composition of RSF

The RSF solution was prepared using procedure described in Nagarkar et al (*Ind. Eng. Chem. Res.* 2009, 0-11). The pH of dialysed RSF solution was adjusted to 7 by adding 0.1N HCL with constant stirring. The concentration of protein was adjusted to 5 g/L using de-ionized water of pH 7. Known weight of silica nanoparticles of 40 nm was added to the RSF solution. These solutions were kept at 25° C., 50° C. and 70° C. in a constant temperature water bath and the state of the sample was monitored after every 3 hrs. The gel state and gelation time were noted using vial tilting method.

Example 5

Preparation of Composition of RSF

The RSF solution was prepared using procedure described in Nagarkar et al (*Ind. Eng. Chem. Res.* 2009, 0-11). The pH of dialysed RSF solution was adjusted to 7 by adding 0.1N HCL with constant stirring. The concentration of protein was adjusted to 5 g/L using de-ionized water of pH 7. Known weight of silica nanoparticles of 150 nm was added to the RSF solution. These solutions were kept at 25° C., 50° C. and 70° C. in a constant temperature water bath and the state of the sample was monitored after every 3 hrs. The gel state and gelation time were noted using vial tilting method.

Example 6

Preparation of Composition of RSF

The RSF solution was prepared using procedure described in Nagarkar et al (*Ind. Eng. Chem. Res.* 2009, 0-11). The pH of dialysed RSF solution was adjusted to 7 by adding 0.1N HCL with constant stirring. The concentration of protein was adjusted to 5 g/L using de-ionized water of pH 7. Known weight of silica nanoparticles of 400 nm was added to the RSF solution. These solutions were kept at 25° C., 50° C. and 70° C. in a constant temperature water bath and the state of the sample was monitored after every 3 hrs. The gel state and gelation time were noted using vial tilting method.

The resultant acceleration in gelation time of RSF for examples 1-6 for different concentrations of silica and RSF solution" is tabulated in tables 1, 2 and 3 above.

Example 7

Mechanical Properties

The compression modulus (E') of the RSF gels of the invention was measured by Rheometric Series RSA-III test station (TA instrument—Waters LLC, New Castle Del. 1970). A homemade accessory comprising a 15 mm diameter upper plate and a 27 mm inner diameter by 4 mm high cylinder, which served as a sample holder and the lower plate, was used to test the samples. The RSF gels formed in 15 ml culture vials were placed in a sample holder. After a waiting period of about half hour, silicon oil (SF-1000, GE Bayer Silicones, India) was applied to the edge of the sample to avoid water loss from RSF gels. Dynamic strain sweep test was carried out on all samples at frequency 1 Hz and strain increasing from 0.01% to 3% by an increment of 0.01%. Tables 5 and 6 shows the measured compression modulus of RSF gels with and without nanoparticles.

TABLE 5

Compression modulus measurements of RSF gels with and without nanoparticles.

| Sr No | RSF Protein Concentration (g/L) | Silica Conc. (g/L) | Gel Modulus E' (Pa) | |
|---|---|---|---|---|
| | | | With Silica | Without Silica |
| 1. | 5.0 | 5.0 | 2825.0 | 497.0 |
| 2. | 10.0 | 10.0 | 13538.0 | 4696.0 |

TABLE 6

The compression modulus measurements of 5 g/L RSF gel in presence of various concentrations of nanoparticles.

| Sr. No | Temperature [° C.] | RSF Protein Concentration [g/L] | Silica Particles Concentration [g/L] | Modulus E' [Pa] |
|---|---|---|---|---|
| 1. | 25.0 | 5.0 | 5 | 1539.0 |
| 2. | 25.0 | 5.0 | 2.5 | 663.16 |
| 3. | 25.0 | 5.0 | 1.25 | 845.0 |
| 4. | 25.0 | 5.0 | 0.64 | 976.42 |

Example 8

Porosity Measurements by CLSM

Figure 5:
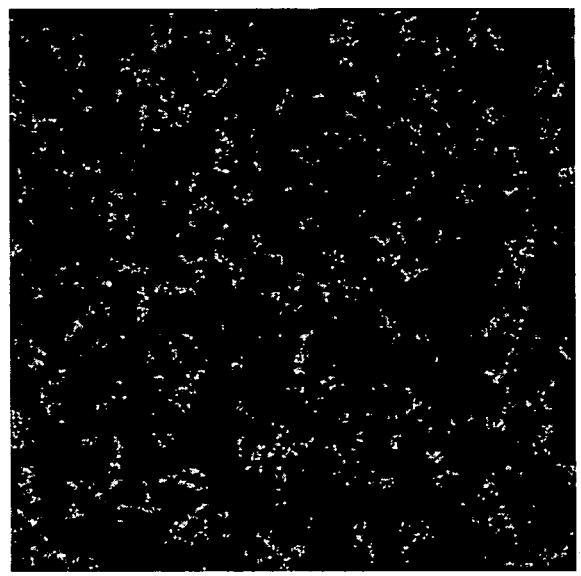
FIG. 5: CSLM image of RSF gel at concentration 5 g/L, pH 2 and 50° C. (The width of the image represents 160 μm.) where the protein forming the porous structure is observed.

The porosity of RSF gels was quantitatively calculated by Confocal Laser Scanning Microscope (CLSM). The microscopic images of RSF gels as shown in FIG. 5 were obtained using a Carl Zeiss Confocal Microscope. Porosity of RSF gels was calculated from the known magnification of the objective. The porosity of RSF gels varies from 100 micron to 10 micron for RSF concentration of 1 g/L to 5 g/L. FIG. 5 shows the CSLM image of RSF gel at concentration 5 g/L, pH 2 and 50° C.

Example 9

Gelation Study of RSF as a Function Seeding Time

RSF was prepared by using the following process. Silk cocoons were boiled in 0.5 wt-% of sodium bicarbonate ($NaHCO_3$) for one hour to remove sericin. The boiled fibroin fibers were washed thoroughly with excess quantity of water to remove the $NaHCO_3$. The silk fibroin so obtained was then dissolved in 9.3M LiBr solution to obtain a 10 wt % solution. This solution was dialyzed (cellulose acetate dialysis bag from Sigma Aldrich, MWC=10,000) against de-ionized water for 48 hours. The first batch of de-ionized water was changed after 3 hours and thereafter every 9 hours. The dialyzed RSF solution was centrifuged at 15000 RPM for 20 minutes after which concentration of protein was determined using UV visible spectroscopy using 11.8 as the molar extinction coefficient (Izuka at al, 1968). Dialyzed solution was always stored in refrigerator at 5-7° C. pH of dialysed solution was measured to be 8.7.

The pH of a portion of the dialysed solution was adjusted by adding 0.1 M HCL solution drop wise with constant stirring. During the pH adjustment a part of the protein precipitated out and this was removed by centrifugation at 15000 RPM for 20 min. The supernatant protein solution thus obtained, hereafter called the 'sol', was clear and its concentration was determined by UV—visible spectroscopy before using it for further studies. 9 sample vials each containing 5 ml of the sol were prepared. 27 μl of 3M NaOH was added to sample vial no 1 to increase its pH to 8.7 which is equal to the pH of the dialysed RSF. We will refer to this sample as one having zero 'seeding' time. The sol samples in the other eight vials were maintained at low pH for different 'seeding' times between 0 and 24 h as mentioned in Table 4 after which 27 μl of 3M NaOH was added to each of them. The state of the sample at the time of adding the NaOH solution and the gelation time after addition of NaOH are reported in Table 4.

ADVANTAGES OF THE INVENTION

1. Ambient condition of temperature as well as pH accelerates the gelation process.
2. Acceleration results in gelation time reducing to few hours in comparison to several days.
3. The decrease in gelation time makes the gel available for a wide variety of applications.
4. The gel is not susceptible to microbial growth.
5. Porous network with a wide range of porosity obtained.
6. Alternate method of self seeding also results in acceleration of gelation time.

We claim:

1. A process for gelation of regenerated silk fibroin (RSF) to obtain a gel having a porous structure comprising the steps of:
    a) adjusting (i) the pH of a regenerated silk fibroin solution to pH 5-7.5 and (ii) its concentration to be in the range of 0.1 to 40 w/w %;
    b) adding a gelation agent selected from the group consisting of silica, $FeO_2SiN_3$ and hydroxyapetite, and maintaining temperature of a mixture of said silk fibroin solution and gelation agent at a range of 20-70° C. to obtain RSF gel; and
    c) Checking the gelation of RSF by tube inversion method or vial tilting method.

2. The process as claimed in claim 1, wherein said gelation is carried out by self seeding with silk fibroin protein, at alkaline conditions.

3. The process as claimed in claim 1, wherein the time period for the gelation of regenerated silk fibroin ranges from 3 hours to 6 days.

4. The process as claimed in claim 1, wherein said gelation agent is used in a concentration range of 1 g/L to 25 g/L.

5. The process as claimed in claim 4, wherein said gelation agent is in a concentration range of 1 g/L to 5 g/L.

6. The process as claimed in claim 1, wherein said gelation agent has a particle size in the range from 1 nm-1 μm.

7. The process as claimed in claim 6, wherein said gelation agent has a particle size in the range from 1 nm-400 nm.

8. The process as claimed in claim 1, wherein the gelation agent is silica.

* * * * *